June 22, 1926.
O. S. BARNUM
DIVIDED WASHER
Filed August 31, 1921
1,589,455
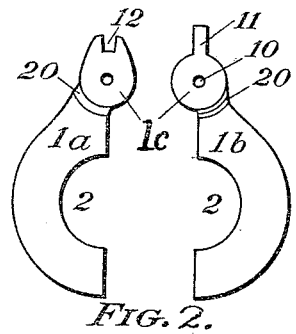
FIG. 4.   FIG. 2.
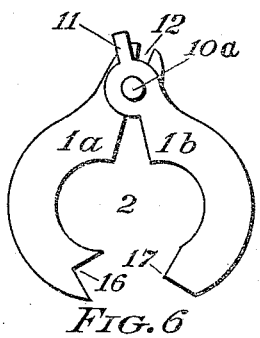
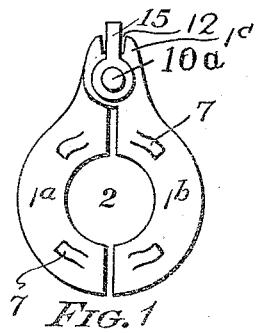
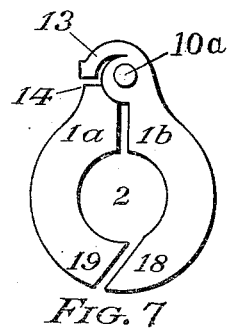
FIG. 6.   FIG. 1.   FIG. 7.
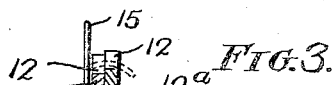
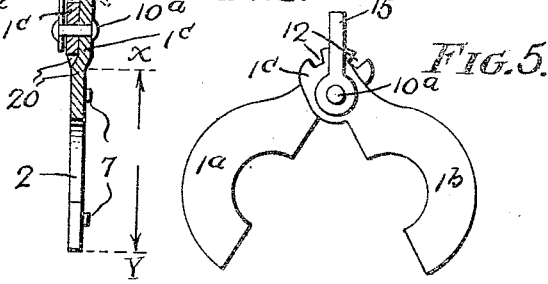
FIG. 3.   FIG. 5.
Oliver S. Barnum
Inventor Patented June 22, 1926.

1,589,455

UNITED STATES PATENT OFFICE.

OLIVER S. BARNUM, OF ALHAMBRA, CALIFORNIA.

DIVIDED WASHER.

Application filed August 31, 1921. Serial No. 497,119.

My invention relates to a washer designed to serve as a cushion or packing in an axle bearing or joint, and differing from the ordinary type of washer in that it may be placed in desired position and removed therefrom without dismembering the bearing or joint in any degree. This I accomplish by dividing the washer body into halves and joining the same in a manner to allow said halves to be separated to straddle the axle or joint pin, and then returned to normal position of apposition to surround the same.

I prefer to stamp my device from flat spring steel, each of the washer halves being provided with a projecting perforated lug and hinged together by means of a pivot through said perforations. By this construction the halves may be separated by manipulation of the fingers to straddle an axle or joint pin, then pushed back into normal closed position surrounding the same, and removably locked in such position at will.

The advantages of such a divided washer are evident in the construction of an automobile, for instance, where the brake-rod-lever joints comprise a rod with spanning end, a lever arm bearing therein, a bearing pin passing therethrough and fixed by a cotter. To take up side play in such a joint it has been common practice to dismember the joint by removing the cotter, withdrawing the pin, fitting an ordinary washer in place and then replacing the pin and cotter,— a procedure requiring considerable time and much inconvenience.

With this device a divided washer may be selected of the proper thickness or gauge to take up all side play, separated by the fingers to straddle the pin, instantly slipped between the abutting surfaces of the joint and removably fixed in position to completely surround the pin as does an ordinary washer.

The invention will be readily understood from the following description, reference being had to the accompanying drawings, in which—

Figure 1 is a view of the complete and assembled washer in normal closed position, showing tongues cut in the body thereof, and a locking means comprising an auxiliary washer provided with a projecting tongue adapted to be bent into corresponding notches provided in the periphery of the lugs of the washer halves.

Figure 2 is a view of the washer halves formed and stamped to be hinged through perforations in projecting lugs thereon provided; and showing off-sets at the junction of each washer half and its lug, adapted to afford alinement of said halves when in normal closed position; and modified means of locking said halves in closed position.

Figure 3 is a diametrical cross-section of the assembled washer, showing the relation of the halves by reason of the off-sets at the junction of washer halves and lugs; the pivot pin on which said halves are hinged; and an auxiliary washer with a projecting tongue adapted to serve as a locking means when bent into corresponding notches provided in said lugs.

Figure 4 is a cross section of a resilient tongue cut in the body of the washer halves.

Figure 5 is a view of the complete washer positioned to straddle an axle or joint pin, showing an auxiliary washer, and notches in the lugs of both halves, adapted to be in apposition when the washer is closed, to receive the tongue of said auxiliary washer.

Figure 6 is a view of the complete and assembled washer, showing a modified form of locking means and serrated corresponding distal ends of the halves.

Figure 7 shows an assembled washer with a modified form of locking means.

Referring more particularly to the drawings, in which similar numerals indicate corresponding parts in all of the figures:—

$1^a$—$1^b$ indicate separable halves of the washer; $1^c$—$1^c$ indicate projecting lugs on halves $1^a$—$1^b$;

10 indicates perforations through lugs $1^c$—$1^c$ adapted to receive pivot pin $10^a$;

2 indicates an orifice through the normally closed washer, adapted to receive a shaft, joint-pin or the like;

7—7 indicate multiple tongues cut in the body of washer halves $1^a$—$1^b$, slightly offset from the plane of the washer and formed crescentically in their longer dimension, adapted to increase the relative thickness of the washer.

15 indicates an auxiliary washer provided with a perforation adapted to receive pivot $10^a$, and further provided with a projecting tongue adapted to be bent to enter notches 12—12 for locking purposes;

16—17—18—19 indicate modified forms of stamping the distal ends of halves 1ª—1ᵇ to interlace and avoid a gap between the same.

20—20 indicate offsets at the junction of halves 1ª—1ᵇ with their respective lugs 1ᶜ—1ᶜ, adapted to afford alinement of said halves in an approximately exact plane when hinged on pivot 10ª;

Line X—Y indicates the diameter of the washer body proper, beyond which lugs 1ᶜ—1ᶜ project.

The assembling and operation of this device will be apparent from the foregoing description taken in connection with the drawings and following statement.

To fully understand the various features of my invention it must be borne in mind that its objects, somewhat in detail, are: to take up wear in bearings; to compensate for unevenness in bearing and joints when the same are drop-forged and lack accurate machining; to absorb side thrust in shaft bearings and the like; and to prevent noise in loose or rattling joints. To accomplish these objects it is essential that the washer be struck from exceedingly thin material, for instance, of spring steel of .006″ and .010″ gauge, as they are now being manufactured.

The use of such thin material bars any ordinary means of hinging and providing locking means, and I have therefore devised the novel as well as essential features above set forth, namely, projecting perforated lugs 1ᶜ—1ᶜ and pivot 10ª therethrough for hinging means. To insure approximately exact alinement of halves 1ª—1ᵇ when moving on hinge pivot 10ª I have provided offsets 20—20 at the junction of each washer half with its respective lug, said offset being equal to one-half of the thickness of the washer material, in opposite direction and transversely to the plane of the washer.

For locking means I have provided an auxiliary washer with a projecting bendable tongue, 15, approximate in diameter to that of the lug, adapted to be positioned on pivot 10ª and against which said pivot is upset; and notches 12—12 in the periphery of lugs 1ᶜ—1ᶜ, adapted to register when halves 1ª—1ᵇ are in normal closed position. Said notches are cut slightly V shaped in order that the advance of bendable tongue 15 of the auxiliary washer, may force the distal ends of halves 1ª—1ᵇ into closer approximation.

Joints like those of brake rods in automobiles are seldom machined and the abutting surfaces are therefore more or less rough and uneven. An ordinary flat washer could not take up such unevenness and eliminate side play or end thrust without increasing friction, and to do so effectively a resiliency is necessary such as provided in my invention by tongues 7—7. These tongues, cut wholly within the body of the washer halves, are slightly off-set from the plane thereof, variously directed, and crescentically formed in their longer dimension as illustrated in the drawings. By means of these tongues, 7—7, I have created a relative thickening of the washer material, and when the same is struck from spring steel, the multiple tongues constitute a resilient relative thickening of the washer adapted to take up or absorb side play or end thrust, and at the same time lessen friction. In actual practice, where the washers are small, I elect to have said tongues, 7—7, off-set on one side of the assembled washer only, so that the bearing surface on one side is approximately the entire surface of the washer, while on the other side the convex surface of the said tongues form the bearing surface against the abutting surface of the joint or bearing. However, where a larger size of the washer allows cutting of a larger number of tongues, it is desirable to have the same project beyond the plane of the washer on both sides, thus increasing the absorptive function of the same by increased number, and further reducing friction in the joint or bearing.

The direction of the tongues 7—7 varies in order that the root of any one of them will enter between the abutting surfaces of a joint first, and pressure of the fingers to close the washer will successively compress them as the procedure progresses. I have designed the tongues to be crescentically formed in their longer dimension to avoid biting of the tips into abutting surfaces, and to afford a comparatively smooth surface on the convex surface thereof. Without such crescentic form the insertion of my washer into a joint would be comparatively much more difficult and the purpose of decreasing friction would in some measure be defeated.

Should the distal ends of halves 1ª—1ᵇ be struck out diametrically as in Figure 1, carelessness in bending tongue 15 into notches 12—12 might leave a gap between said ends, and I therefore prefer to strike out washer halves 1ª—1ᵇ with distal ends serrated as at 16—17—18—19.

When properly assembled as shown and described, halves 1ª—1ᵇ are separated by manipulation of the fingers to straddle an axle, joint pin or the like, (Fig. 5), pushed back into normal closed position, (Fig. 1), and removably locked by bending tongue 15 into notches 12—12.

A modified form of locking means is shown in Figure 7, wherein a spring tongue, 13, is cut peripherally in the lug of one of the washer halves and slightly offset from the plane of the washer to impinge on a shoulder, 14, provided in the periphery of the other washer half. By pressing tongue 13 forwardly it will clear shoulder 14 and the washer halves swing freely on pivot 10ª.

It is manifest that many changes and departures from the disclosures herein may be made in adapting the invention to various requirements of use and service without departing from the spirit of the invention and the terms of the following claims.

Having thus disclosed my invention I claim as new and desire to secure by Letters Patent:

1. A washer of the character disclosed comprising separable halves adapted to encircle a shaft or bolt in a bearing or joint for the purpose of eliminating side play between the abutting surfaces thereof; said halves being provided with perforated ex-peripheral lugs hinged upon a pivot therethrough; and a locking means adapted to maintain said halves in a normal closed position.

2. A washer of the character disclosed comprising separable halves adapted to encircle a shaft or bolt in a bearing or joint for the purpose of eliminating side-play between the abutting surfaces of the same; said halves being provided with projecting perforated lugs and hinged upon a pivot therethrough; said halves being further provided with off-sets at the junction of each of said halves with its respective lug, the same being adapted to insure alinement of said halves in approximate exact plane when assembled.

3. A washer of the character disclosed comprising separable halves adapted to encircle a shaft or the like; said halves being provided with perforated projecting lugs and hinged by a pivot therethrough; said lugs provided with notches in their periphery adapted to be in apposition when said washer halves are in normal closed position; and a locking means comprising an auxiliary washer of soft metal approximate in size to said lugs and against which one end of said pivot is upset; said auxiliary washer being provided with a projecting tongue adapted to be bent into said notches when in apposition.

4. A washer of the character disclosed, comprising separable halves adapted to encircle a shaft or bolt in a bearing or joint to eliminate side-play between the abutting surfaces thereof; said halves being provided with perforated ex-peripheral lugs hinged upon a pivot therethrough: said halves being further provided with multiple tongues cut within the body thereof and off-set from the plane of the washer to constitute a resilient relative thickness of the same, said tongues being variously directed and formed crescentically in their longer dimension; and a locking means adapted to maintain said halves in normal closed position.

5. A washer of the character disclosed comprising separable halves struck from spring metal and adapted to encircle a shaft or the like; said halves being provided with perforated lugs wholly projecting beyond the periphery of the washer body, and a pivot therethrough adapted to constitute a hinge by means of which said halves may be separated to straddle a shaft or the like and to encircle the same when closed; an auxiliary washer struck from soft metal and approximating the size of said lugs, against which one end of said pivot is upset; said auxiliary washer provided with a projecting tongue; said lugs provided with peripheral notches adapted to be in apposition to receive said auxiliary washer tongue when said halves are in normal closed position; said halves being further provided with corresponding offsets at the junction of the body and its respective lug adapted to afford approximately exact alinement of washer halves when properly assembled; said halves being further provided with multiple tongues cut in the body of the same and variously directed, said tongues being crescentically formed in their longer dimension and slightly offset from the plane of the washer, substantially as set forth.

In testimony whereof I have signed my name to this specification.

OLIVER S. BARNUM.